United States Patent
Na et al.

(10) Patent No.: US 9,420,246 B2
(45) Date of Patent: *Aug. 16, 2016

(54) PROJECTION SYSTEM WITH INFRARED MONITORING FUNCTION

(71) Applicant: PIQS TECHNOLOGY (SHENZHEN) LIMITED, Shenzhen, Guangdong (CN)

(72) Inventors: Qinglin Na, Shenzhen (CN); Yan Huang, Shenzhen (CN); Haohuang Mai, Shenzhen (CN); Haixiang Wang, Shenzhen (CN)

(73) Assignee: PIQS TECHNOLOGY (SHENZHEN) LIMITED, Shenzhen (CN)

( * ) Notice: Subject to any disclaimer, the term of this patent is extended or adjusted under 35 U.S.C. 154(b) by 42 days.

This patent is subject to a terminal disclaimer.

(21) Appl. No.: 14/408,293

(22) PCT Filed: Dec. 26, 2012

(86) PCT No.: PCT/CN2012/087548
§ 371 (c)(1),
(2) Date: Dec. 16, 2014

(87) PCT Pub. No.: WO2014/082361
PCT Pub. Date: Jun. 5, 2014

(65) Prior Publication Data
US 2015/0109589 A1  Apr. 23, 2015

(30) Foreign Application Priority Data
Nov. 30, 2012 (CN) .................. 2012 2 0651171 U

(51) Int. Cl.
| | |
|---|---|
| G03B 21/14 | (2006.01) |
| H04N 9/31 | (2006.01) |
| G03B 21/53 | (2006.01) |
| G02B 7/36 | (2006.01) |
| G06F 3/01 | (2006.01) |

(52) U.S. Cl.
CPC .................. H04N 9/317 (2013.01); G02B 7/36 (2013.01); G03B 21/142 (2013.01); G03B 21/53 (2013.01); G06F 3/01 (2013.01); H04N 9/3194 (2013.01)

(58) Field of Classification Search
CPC ....... H04N 9/31; H04N 9/317; H04N 9/3176; H04N 9/3102; H04N 9/3105; H04N 9/3108; H04N 9/3194; G02B 7/02; G02B 13/14; G06F 3/0418; G06F 3/0421; G03B 21/14; G03B 21/142; G03B 21/53
USPC .................................................. 353/69, 101
See application file for complete search history.

(56) References Cited

U.S. PATENT DOCUMENTS

| | | | | |
|---|---|---|---|---|
| 3,635,551 A | * | 1/1972 | Szymber ................ | G03B 21/53 250/204 |
| 5,400,093 A | * | 3/1995 | Timmers .................. | G02B 7/32 348/745 |
| 5,537,168 A | * | 7/1996 | Kitagishi ................ | G03B 21/53 348/E5.137 |
| 2002/0063852 A1 | * | 5/2002 | Liang ....................... | G02B 7/28 353/53 |
| 2008/0051135 A1 | * | 2/2008 | Destain .................. | G03B 17/54 455/556.1 |
| 2015/0015854 A1 | * | 1/2015 | Na ......................... | H04N 9/317 353/101 |
| 2015/0338667 A1 | * | 11/2015 | Na ......................... | G02B 27/20 353/42 |
| 2016/0021351 A1 | * | 1/2016 | Yamagishi ............. | G02B 13/16 348/745 |

FOREIGN PATENT DOCUMENTS

CN   201226040 Y   4/2009

* cited by examiner

Primary Examiner — William C Dowling

(57) ABSTRACT

A projection system includes a projection module, an infrared monitoring module, and a focusing device. Lights of a projection light source (100) pass through a light splitting element (500) and a first lens group (201), and then emit out; infrared lights from outside pass through the first lens group (201) and the light splitting element (500) to an infrared monitoring module (300). Only the first lens group (201) can move back and forth and a focusing device is provided for driving the first lens group (201) to move back and forth. Optical characteristics of a projection objective (200) and a monitoring objective ensure that, during moving of the first lens group (201) driven by the focusing device, the projection objective (200) focuses clearly, and an infrared monitoring image received by an induction chip (301) meets monitoring requirements synchronously.

14 Claims, 4 Drawing Sheets

PROJECTION SYSTEM WITH INFRARED MONITORING FUNCTION

FIELD OF THE INVENTION

This invention refers to projection systems, and more particularly to a projection system with infrared monitoring function.

BACKGROUND OF THE INVENTION

As shown in FIG. 1, a Chinese Utility Model with patent No. 200820071126.8 discloses a "big-screen infrared monitoring projection objective" which includes two focusing devices, i.e., a projection focusing device 17 and a monitoring focusing device 19, for solving focusing problems of a projection objective and an infrared monitoring objective. That is, the projection objective and infrared monitoring objective of this patent need to be focused separately.

The labels in FIG. 1 represent as follows: single negative lens 1, single negative lens 2, single negative lens 3, single positive lens 4, light splitting prism 5, single positive lens 6, single negative lens 7, balsaming lens 8, balsaming lens 9, single positive lens 10, filter 11, single positive lens 12, single negative lens 13, single positive lens 14, balsaming lens 15, projection lens barrel 16, projection focusing hand wheel 17, flange 18, monitoring focusing hand wheel 19, monitoring lens barrel 20, flange 21, CMOS chip 22, chip fixed plate 23, field diaphragm 24.

When projection distance changes, the projection focusing device 17 needs to be adjusted for focusing of the projection objective, i.e., pushing the projection lens barrel 16 and the flange 18 to move back and forth as a whole, so as to make focused projection image clear. Because the infrared monitoring objective mounted on the projection lens barrel 16 moves synchronously, the focusing device 19 thus needs to be adjusted to make the infrared monitoring objective be focused, such that images collected by the CMOS chip 22 meets requirements of interactive operation.

Such projection system needs focusing twice, which is inconvenient in operation. In addition, the projection image is formed by visible lights, users can determine whether the focusing is clear by eyes, but the infrared monitoring image is formed by invisible infrared light, and the eyes cannot determine whether the requirements of interactive operation are met.

SUMMARY OF THE INVENTION

For the defects in the art, the present invention needs to solve problems of the conventional projection system which requires focusing twice, and is inconvenient in operation.

To solve the above technical problems, the present invention provides a projection system with infrared monitoring function, including a projection module and an infrared monitoring module. The projection module includes a projection light source and a projection objective, lights of the projection light source emitting out after passing through a light splitting element and a first lens group of the projection objective in turn, extraneous infrared lights entering the infrared monitoring module after passing through the first lens group and the light splitting element in turn; wherein the first lens group is a structure which can move back and forth, and the light splitting element is a fixed structure. The projection system with infrared monitoring function further includes a focusing device for driving the first lens group to move back and forth; and optical characteristics of the projection objective and the monitoring objective ensure that the projection objective focuses clearly, and at the same time an induction chip receives an infrared monitoring image meeting monitoring requirements during telescopically moving of the first lens group.

In the present invention, optical characteristics of the projection module and the infrared monitoring module satisfy the following conditions: when an active area of a display chip in the projection module is larger than an area of an infrared monitoring image formed on the induction chip corresponding to the projected image, an optical magnification of the monitoring objective is larger than that of the optical system formed from the light splitting element to the display chip; when the active area of the display chip in the projection module is smaller than the area of the infrared monitoring image formed on the induction chip corresponding to the projected image, the optical magnification of the monitoring objective is smaller than that of the optical system formed from the light splitting element to the display chip; when the active area of the display chip in the projection module is equal to the area of the infrared monitoring image formed on the induction chip corresponding to the projected image, the optical magnification of the monitoring objective is equal to that of the optical system formed from the light splitting element to the display chip.

In the present invention, an optical angle between of a light path of infrared light at a surface of a first lens of the first lens group, which is reflected from a projection plane to the induction chip to form the infrared monitoring image, is larger than or equal to an emergent light angle of a projected light on the surface of the first lens.

In the present invention, the projection objective further includes a second lens group, the light splitting element locates between the first lens group and the second lens group, the second lens group and the light splitting element are fixed structure, and lights of the projection light source pass through the second lens group, the light splitting element and the first lens group of the projection objective in turn, and then emit out.

In the present invention, the light splitting element comprises two right-angle prisms bonded together, and a bonding plane between the two right-angle prisms is provided with a light splitting film. Alternatively, the light splitting element can be a light splitting sheet.

In the present invention, the projection system with infrared monitoring function further includes an infrared light source, the infrared light source is an infrared laser pointer or an infrared laser emission module, the infrared laser emission module emits an infrared laser plane, and the infrared laser plane is close to and parallel to the projection plane of the projection module.

In the present invention, focusing of the first lens group of the projection system with infrared monitoring function can simultaneously satisfy focusing requirements of the projection objective and the infrared monitoring objective, thus when the projection image is focused clearly, the imaging of infrared spot on the induction chip also meets the requirements for image processing, which is convenient for use. Moreover, since the infrared monitoring module and the projection module share one set of projection imaging system, when projection image is focused clearly, the position and the dimension of the induction image correspondingly formed on the induction chip is changeless at any working distance, which does not change with a size of the projection image, that makes interactive algorithms do not need to re-calibrate position of monitoring points.

BRIEF DESCRIPTIONS OF THE DRAWINGS

The present invention will be further illustrated combining with the following accompanying drawings and embodiments, for the figures.

DETAILED DESCRIPTION OF THE PREFERRED EMBODIMENT

Figure 1:
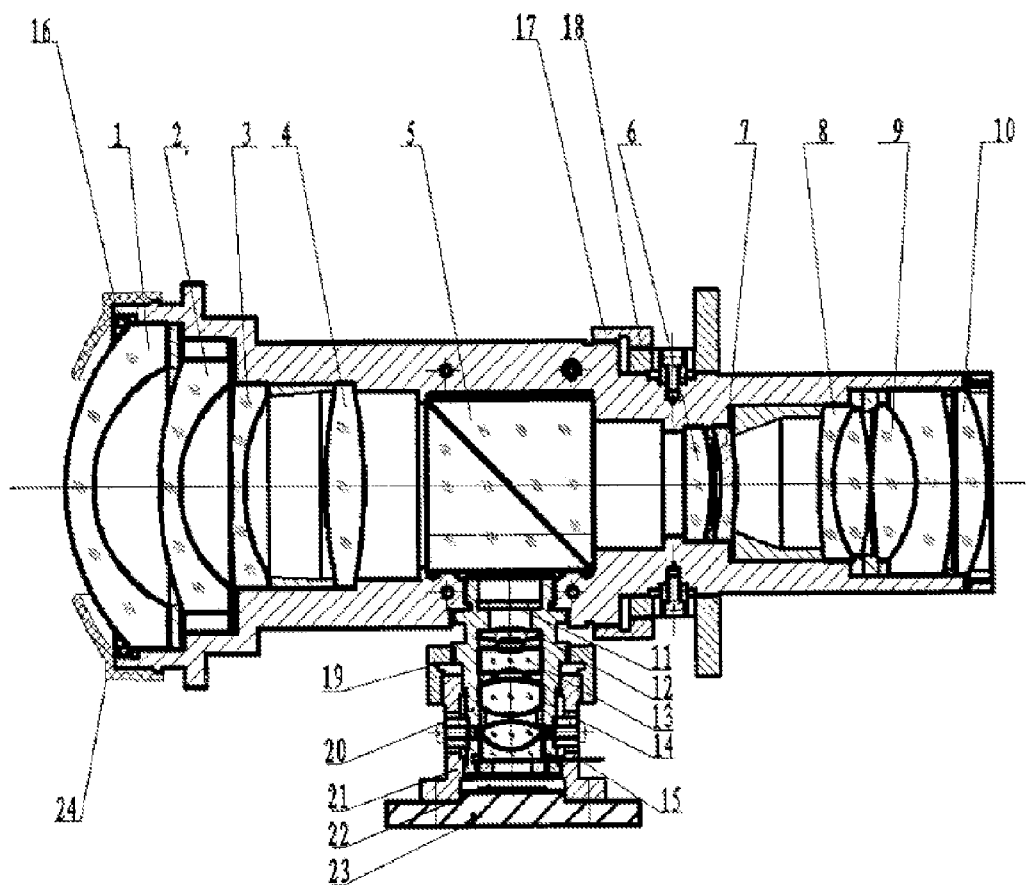
FIG. 1 is a schematic view of a conventional projection system.
Figure 2:
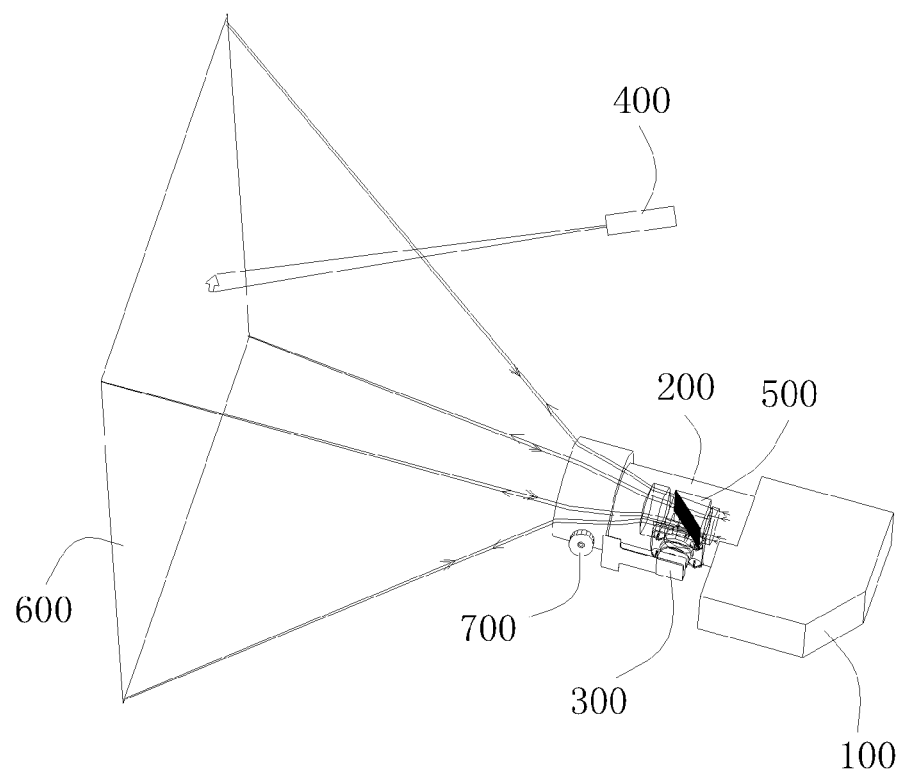
FIG. 2 is a schematic view of a projection system in accordance with an embodiment of the invention.
Figure 3:
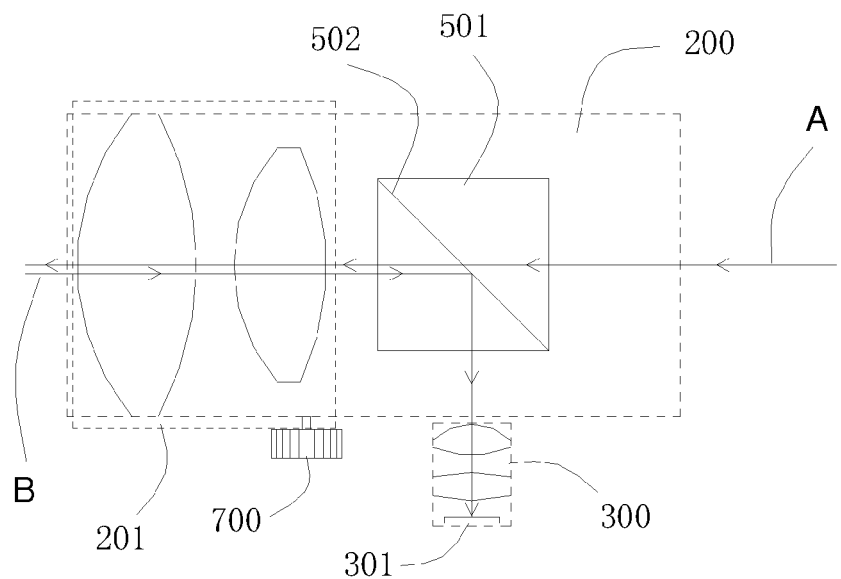
FIG. 3 is a schematic view of a projection objective and an infrared light source of the projection system shown in FIG. 2.

Referring to FIG. 2 and FIG. 3, a projection system of this embodiment includes a projection module and an infrared monitoring module 300; the projection module includes a projection light source 100 and a projection objective 200, lights of the projection light source 100 pass through a light splitting element 500 and a first lens group 201 of the projection objective 200 in turn and then emit out; infrared lights of outside pass through the first lens group 201 and the light spitting element 500 in turn and then to the infrared monitoring module 300; the first lens group 201 is a structure capable of moving telescopically, and the light splitting element 500 is a fixed structure; and a focusing device 700 is provided for driving the first lens group 201 to move. The monitoring module 300 includes a monitoring objective and an induction chip 301 disposed in the monitoring objective.

An optical axis of the infrared monitoring module 300 at rear of the light splitting element 500 is coaxial with that of the projection objective 200, and the optical characteristics of the projection objective 200 and the monitoring objective are designed to ensure that the projection objective focuses clearly and at the same time an infrared monitoring image received by the induction chip 301 focuses clearly enough to meet monitoring requirements during telescopically moving of the first lens group 201 which is driven by the focusing device. Moreover, since the infrared monitoring module and projection module share a single projection imaging system, after a projection image focused clearly, position and dimension of an induction image correspondingly formed on the induction chip is changeless at any working distance. Specifically, the projection module and the infrared monitoring module 300 satisfy the following conditions:

(1) When an active area of a display chip in the projection module is larger than an area of the infrared monitoring image formed on the induction chip corresponding to the projected image, an optical magnification of the monitoring objective is larger than that of the optical system formed from the light splitting element 500 to the display chip. The projected image in this application means a portion of the projection plane 600 occupied by projection of the projected image on the projection plane 600.

(2) When the active area of the display chip in the projection module is smaller than the area of the infrared monitoring image formed on said induction chip corresponding to the projected image, the optical magnification of the monitoring objective is smaller than that of the optical system formed from the light splitting element 500 to the display chip.

(3) When the active area of the display chip in the projection module is equal to the area of the infrared monitoring image formed on said induction chip formed on the induction chip corresponding to the projected image, the optical magnification of the monitoring objective is equal to that of the optical system formed from the light splitting element 500 to the display chip.

Besides, in order to ensure the infrared monitoring without blind areas, an optical angle of a light path of the infrared light at a surface of the first lens of the first lens group, which is reflected back from the projection plane 600 to the induction chip 301 to form the infrared monitoring image, should be larger than or equal to an emergent light angle of a projected light at the surface of the first lens.

Figure 4:
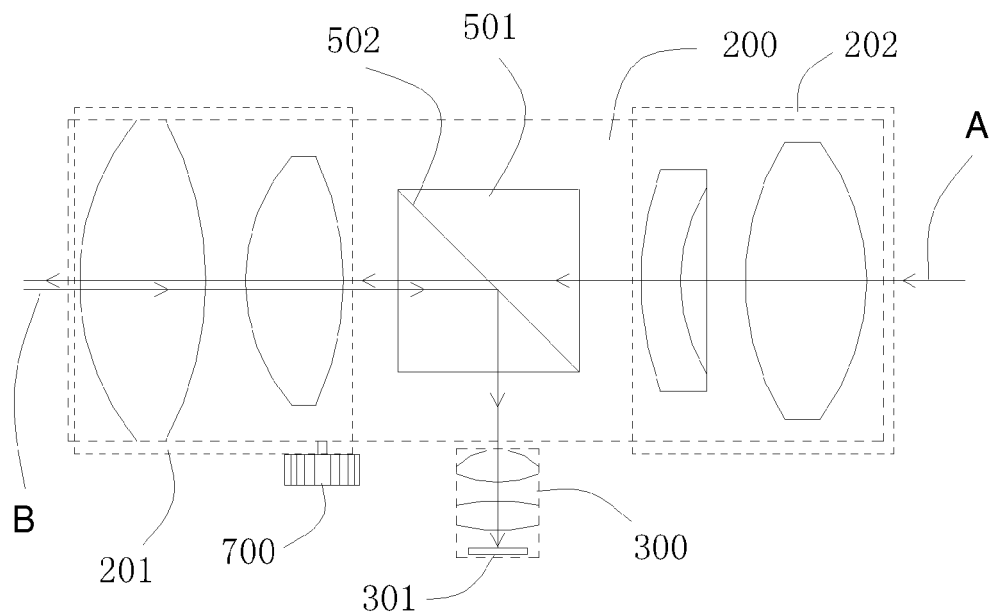
FIG. 4 is a schematic view of an alternative embodiment of the projection objective and infrared light source of the projection system shown in FIG. 2.

In other embodiments, the projection objective and the infrared light source can be structures as shown in FIG. 4. As viewed from FIG. 4, the projection objective 200 further includes a second lens group 202, the light splitting element 500 locates between the first lens group 201 and the second lens group 202. In such a state, the first lens group 201 is a structure capable of moving telescopically, while the second lens group 202 and the light splitting element 500 are fixed structure. Lights of the projection light source 100 pass through the second lens group 202, the light splitting element 500 and the first lens group 201 in turn to outside. The focusing device 700 is used for driving the first lens group 201 to move back and forth. Other structures and operation principle of this embodiment are similar to the embodiment shown in FIG. 3.

Figure 5:
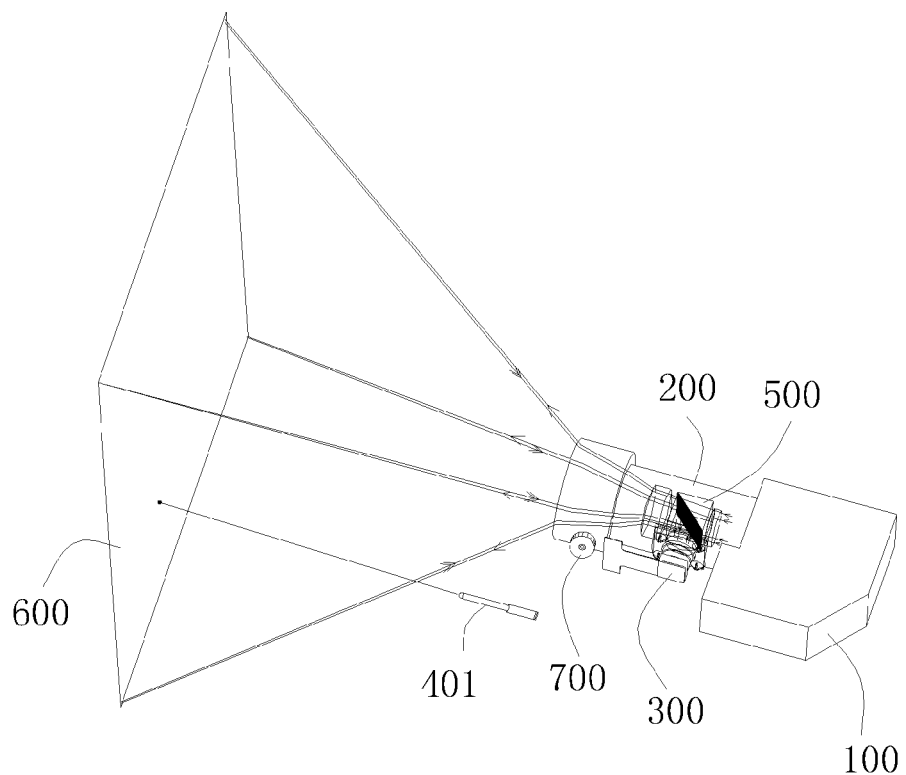
FIG. 5 is a schematic view of a projection system in accordance with a second embodiment of the invention.
Figure 6:
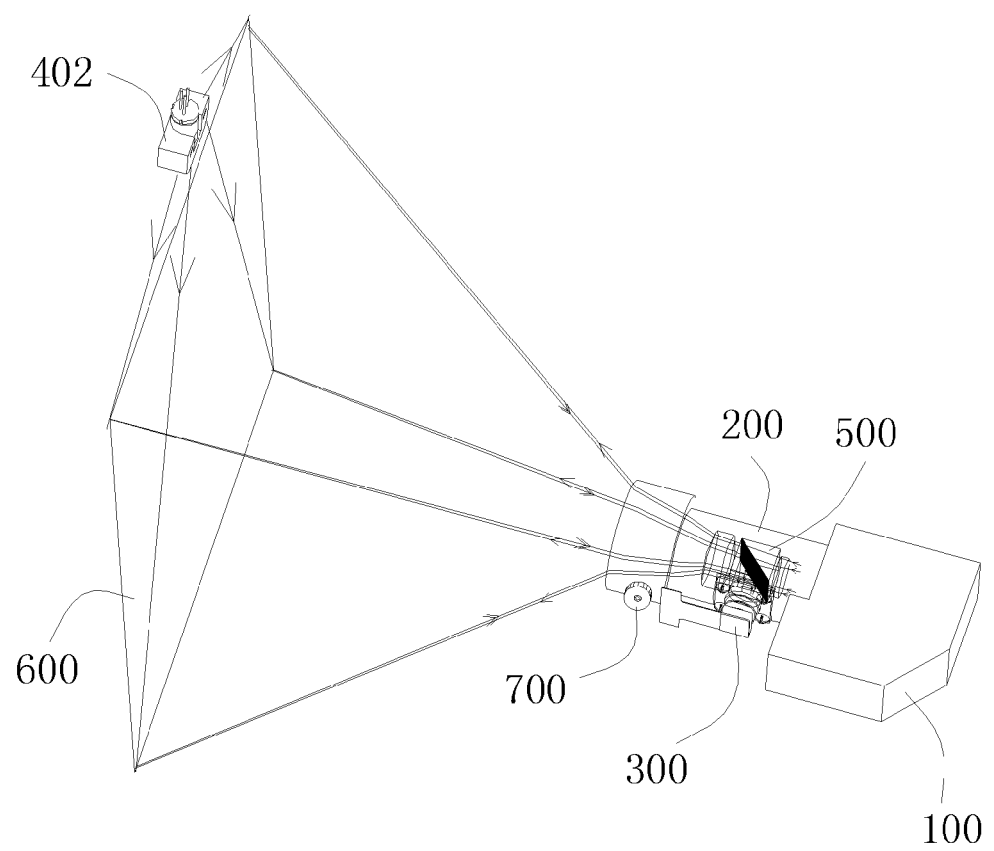
FIG. 6 is a schematic view of a projection system in accordance with a third embodiment of the invention.

As shown in FIG. 2, FIG. 5 and FIG. 6, the infrared light source 400 herein is independent external element, which means the infrared light source 400 is independent from the projection objective. The light splitting element 500 can reflect infrared lights and transmit of visible lights.

When a light beam is emitted from the projection light source 100, and then passes through the projection objective 200 and projects on the projection plane 600, light spots (or images) emitted by the independent external infrared light source 400 arrives at the projection plane 600, continuous infrared images are collected by the induction chip 301 inside the infrared monitoring module 300. An interactive control unit which uses software algorithms calculates the position and trajectory of the light spots, and realizes interactive function.

During the projection process, visible lights (labeled A in FIG. 3 and FIG. 4) can directly pass through the light splitting element 500 in the projection objective 200, which makes the projected image of visible light rays pass though the light splitting element 500 directly and project on the projection plane 600. When the infrared lights (labeled B in FIG. 3 and FIG. 4) on the projection plane 600 travel to the light splitting element 500 through the projection objective 200, the infrared lights are reflected into the infrared monitoring module 300. That is, the optical axis of infrared monitoring module 300 is the optical axis of the projection objective 200 (as shown in FIG. 3 and FIG. 4).

Preferably, the light splitting element 500 can be a light splitting prism. Furthermore, the light splitting prism includes two right-angle prisms 501 (as shown in FIG. 3 and FIG. 4) bonded together, and a bonding interface of the two right angle prisms 501 is provided with a light splitting film 502. The light splitting element 500 can also be a light splitting sheet, which has a working principle the same as that of the two mutually bonded right-angle prisms 501.

Advantages of the present invention is that, the projected plane 600 is coincided with an interred monitoring screen, which makes the induction area on the infrared monitoring module 300 can be as large as possible, thereby getting higher image resolution, better uniformity of brightness, and smaller image distortion. As the first lens group 201 meets the focusing requirements of both of the projection objective 200 and the infrared monitoring module 300, when the projected image 600 is focused clearly, the imaging of the infrared light spots on the induction chip 301 can satisfy requirements of image processing of the interactive control unit, that is much convenient for users. Since the infrared monitoring module 300 and the projection module 200 share a single imaging system, position and dimension of the induction area on the induction chip 301 corresponding to the projected image 600 is changeless when projection is focused clearly, and will not change with change of a size of the projected image 600, such that an interactive algorithm does not need to be re-calibration position of a monitoring points.

As shown in FIG. 5, according to the second embodiment of the present invention, components of the infrared monitoring objective system are nearly the same as that of the first embodiment, the difference is that the independent external infrared light source 400 of the first embodiment is replaced by an infrared laser pointer 401, and the working principle of the second embodiment is the same as that of the first embodiment.

As shown in FIG. 6, according to the third embodiment of the present invention, components of the infrared monitoring objective system is almost the same as that of the first embodiment, the difference is that the independent external provided infrared light source 400 of the first embodiment is replaced by an infrared laser emission module 402. The infrared laser emission module 400 will emit an infrared laser plane, which is close to and parallel to the projection plane 600 of the projection module. When hands make an action in the scope of the infrared laser plane, the infrared laser lights on the hands are reflected into the infrared monitoring module 300, thereby cognizing the action of the hands and realize the interactive function.

The foregoing embodiments are considered to be to illustrative of the contemplation and characteristics of the present invention, for the purpose of that the present invention can be understood and utilized by those skilled in the art, and is not for limiting the scope of the present invention. Any changes and modifications without departing from the scope and spirit of the claims of the present invention should be in the scope of the present invention.

What is claimed is:

1. A projection system with infrared monitoring function, comprising a projection module and an infrared monitoring module; the projection module comprising a projection light source and a projection objective, lights of the projection light source emitting out after passing through a light splitting element in the projection objective and a first lens group in turn, the infrared monitoring module comprising a monitoring objective and an induction chip; extraneous infrared lights passing through the first lens group and the light splitting element in turn to the infrared monitor module; wherein, the first lens group is telescopical movable, the light splitting element is a fixed, and the projection system with infrared monitoring function further comprises a focusing device for driving telescopical movement of the first lens group; wherein, optical axis of the infrared monitoring module at rear of the light splitting element is coaxial with an optical axis of the projection objective; and the optical characteristics of the projection objective and the monitoring objective ensure that during telescopical movement of the first lens group driven by the focusing device, the projection objective focuses clearly, and an infrared monitoring image received by the induction chip meets monitoring requirements;

wherein, the projection module and the infrared monitoring module satisfy the following conditions:

when an active area of a display chip in the projection module is larger than an area of an infrared monitoring image formed on the induction chip corresponding to the projected image, an optical magnification of the monitoring objective is larger than that of the optical system formed from the light splitting element to the display chip;

when the active area of the display chip in the projection module is smaller than the area of the infrared monitoring image formed on the induction chip corresponding to the projected image, the optical magnification of the monitoring objective is smaller than that of the optical system formed from the light splitting element to the display chip;

when the active area of the display chip in the projection module is equal to the area of the infrared monitoring image formed on the induction chip corresponding to the projected image, the magnification of the monitoring objective is equal to that of the optical system formed from the light splitting element to the display chip.

2. The projection system with infrared monitoring function according to claim 1, wherein, the projection objective comprises a second lens group, the light splitting element locates between the first lens group and the second lens group; the second lens group and the light splitting element are fixed structure;

and lights of the projection light source pass through the second lens group, the light splitting element and the first lens group in turn and then emit out.

3. The projection system with infrared monitoring function according to claim 1, wherein, an optical angle of a light path of the infrared light at a surface of a first lens of the first lens group, which is reflected back from a projection plane to the induction chip to form the infrared monitoring image, is larger than or equal to an emergent light angle of a projected light at the surface of the first lens surface.

4. The projection system with infrared monitoring function according to claim 1, wherein, the light splitting element comprises two right-angle prisms bonded together, and a bonding interface of the two right-angle prisms is provided with a light splitting film.

5. The projection system with infrared monitoring function according to claim 1, wherein, the light splitting element comprises a light splitting sheet.

6. The projection system with infrared monitoring function according to claim 1, further comprising a infrared light source.

7. The projection system with infrared monitoring function according to claim 6, wherein, the infrared light source is an infrared laser pointer.

8. The projection system with infrared monitoring function according to claim 6, wherein, the infrared light source is an infrared laser emission module, the infrared laser emission module emitting an infrared laser plane, which is close to and parallel to the projection plane of the projection module.

9. The projection system with infrared monitoring function according to claim 1, wherein, an optical angle of a light path of the infrared light at a surface of a first lens of the first lens group, which is reflected back from a projection plane to the induction chip to form the infrared monitoring image, is larger than or equal to an emergent light angle of a projected light at the surface of the first lens surface.

10. The projection system with infrared monitoring function according to claim 2, wherein, the light splitting element comprises two right-angle prisms bonded together, and a bonding interface of the two right-angle prisms is provided with a light splitting film.

11. The projection system with infrared monitoring function according to claim 2, wherein, the light splitting element comprises a light splitting sheet.

12. The projection system with infrared monitoring function according to claim 2, further comprising a infrared light source.

13. The projection system with infrared monitoring function according to claim 12, wherein, the infrared light source is an infrared laser pointer.

14. The projection system with infrared monitoring function according to claim 12, wherein, the infrared light source is an infrared laser emission module, the infrared laser emission module emitting an infrared laser plane, which is close to and parallel to the projection plane of the projection module.

* * * * *